United States Patent [19]

Anderson et al.

[11] 4,266,293
[45] May 5, 1981

[54] PROTECTION CONTROL UNIT FOR A TDM SYSTEM

[75] Inventors: Richard L. Anderson, Mountain View; William E. Fleig, San Jose, both of Calif.

[73] Assignee: Farinon Corporation, San Mateo, Calif.

[21] Appl. No.: 44,700

[22] Filed: Jun. 1, 1979

[51] Int. Cl.³ .............................................. H04J 3/14
[52] U.S. Cl. ...................................... 370/14; 370/16; 371/24
[58] Field of Search ............... 179/15 BF, 175.3 R, 179/175.3 S, 175.2 C; 324/51; 370/14, 16, 17; 371/24

[56] References Cited

U.S. PATENT DOCUMENTS

| 4,037,054 | 7/1977 | Neufang ........................ 179/15 BF |
| 4,064,369 | 12/1977 | Battocletti ...................... 179/15 BF |
| 4,071,700 | 1/1978 | Huffman et al. ................ 179/15 BF |
| 4,156,110 | 5/1979 | Keeney et al. ......................... 370/14 |

Primary Examiner—Douglas W. Olms
Attorney, Agent, or Firm—Flehr, Hohbach, Test et al.

[57] ABSTRACT

A digital multiplexing system including first and second multiplexers, each connected to a plurality of multi-timeslot digital data buses for multiplexing digital data on said plurality of buses to first and second buses, respectively, thereby forming first and second serial bit streams. Protection control apparatus is included for comparing the corresponding bits of said first and second serial bit streams and for generating an alarm signal when a mismatch occurs between the comparison of said first and second bit streams within a predetermined period of time.

8 Claims, 12 Drawing Figures

— — — XMT TEST
- - - - - - RCV TEST

PROTECTION CONTROL UNIT FOR A TDM SYSTEM

BACKGROUND OF THE INVENTION

The present invention relates to a digital multiplexing system and more particularly to protection control apparatus for use therein. Digital multiplexing systems such as utilized with a telephone system provide faster switching capability than presently existing analog telephone systems because of the capability of utilizing digital techniques. However, digital multiplexing systems are extremely complex and a failure of any portion of a multiplexing system can affect its capability to provide the necessary communications link in the telephone system. Consequently, there is a need to insure that the multiplexing system is functioning properly and in addition can provide protection procedures should there be a failure somewhere in the system.

Some prior art systems have utilized the generation and sending of a test code through a multiplexer which is then compared with a stored reference code to verify that the multiplexer is operating properly. Upon the detection of a faulty multiplexer by virtue of the test code, a stand-by redundant multiplexer is activated to provide the necessary multiplexing/demultiplexing capabilities in place of the failed multiplexer.

While generation of a test code and redundancy techniques are known in the art, providing redundancy on a one for one basis becomes expensive, and as a result it would be desirable to provide protection control apparatus that could be utilized for testing multiplexing systems and providing stand-by capabilities without the need for one for one redundancy schemes such as in prior art systems.

SUMMARY OF THE INVENTION

The present invention relates to a digital multiplexing system and more particularly to protection control apparatus for use therein.

In one embodiment, the system includes first active and second stand-by multiplexer means each connected to a plurality of multi-timeslot digital data buses where each of the buses have a first time slot rate. The first and second multiplexer means multiplex digital data on a plurality of buses to first and second multi-timeslot buses, respectively, where each of said first and second buses have a second time slot rate faster than said first time slot rate, thereby forming first and second serial bit streams.

The system includes protection control apparatus for comparing the corresponding bits of the first and second serial bit streams and for generating an alarm signal when a mismatch occurs between the comparison of said first and second bit streams within a predetermined period of time.

The protection control apparatus includes first and second register means connected to receive the respective serial digital data streams, elastic store means for sequentially storing the serial bits in said second data stream, selector means for selecting the stored bits in said elastic store means, comparator means for comparing the first serial data stream with said selected stored bits from said elastic store means on a bit by bit basis and for generating said control signal when a mismatch occurs. Processor means are included for controlling the operation of said protection control apparatus.

In accordance with the above summary, the present invention achieves the objective of providing an improved digital multiplexing system.

Other objects and features of the present invention will appear from the following detailed description when taken in conjunction with the accompanying drawings.

DESCRIPTION OF THE PREFERRED EMBODIMENT

Figure 1:
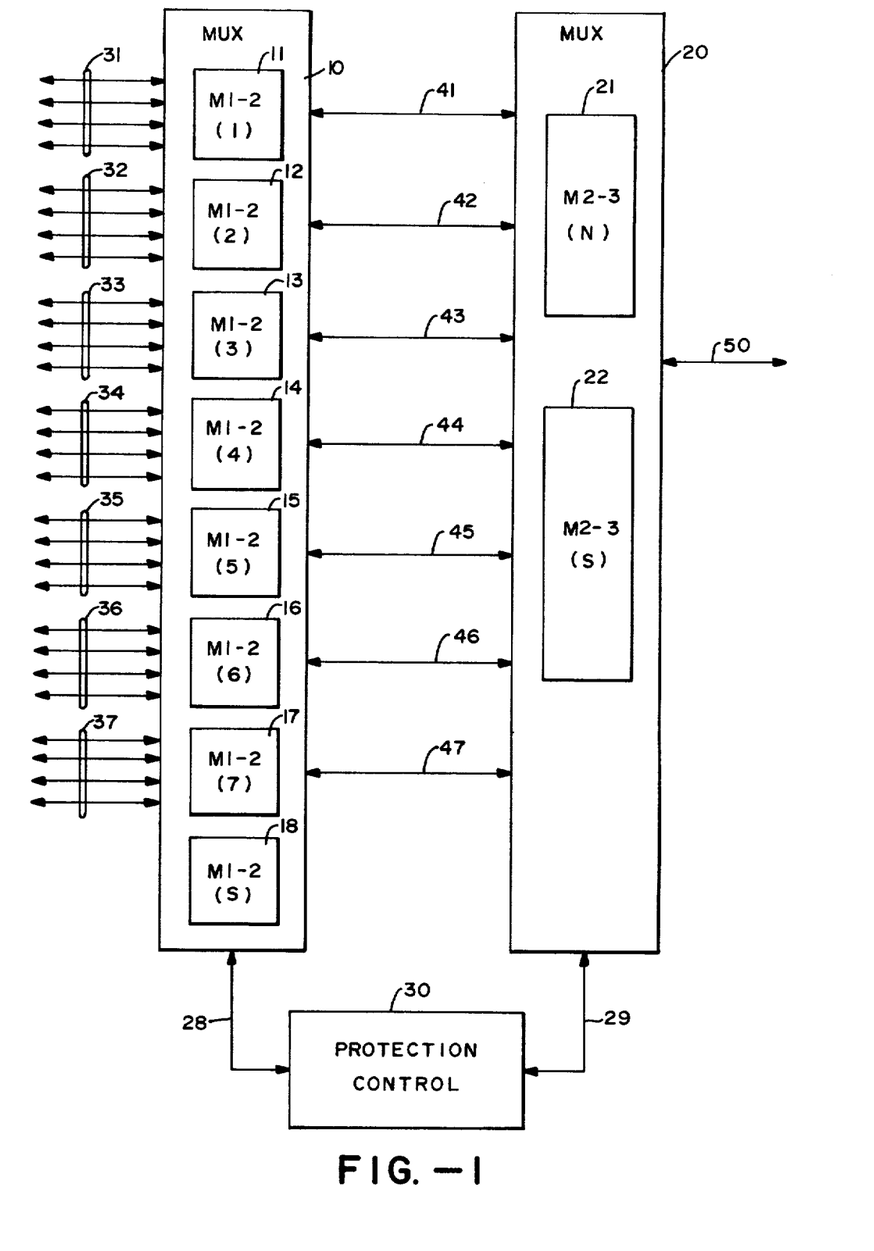
FIG. 1 depicts a block diagram of a digital multiplexing system according to the present invention, including M1-2 and M2-3 multiplexers.

Referring now to FIG. 1, a block diagram of a digital multiplexing system including protection control apparatus according to the present invention is depicted. The system of FIG. 1 provides multiplexing and demultiplexing capability for up to 28 DS-1 data streams and provides appropriate interfacing between the DS-1 line rate (1.544 Mb/S) and the DS-3 line rate (44.736 Mb/S).

Multiplexer means 10 includes multiplexers 11-17 for providing appropriate multiplexing/demultiplexing between DS-1 data streams on T1 buses 31-37 and DS-2 data streams on T2 buses 41-47. For example, multiplexer 11 provides multiplexing/demultiplexing capabilities for buses 31, which include four T1 lines, which are multi-timeslot digital data buses providing 24 time slots on each bus. Multiplexer 11 also is connected to T2 line 41, which operates at 6.312 Mb/S, and is a digital data bus having 96 time slots.

Similarly, multiplexers 12-17 provide multiplexing-/demultiplexing capability for buses 32-37, 42-47, respectively.

Multiplexer means 20 include multiplexer 21 which provides multiplexing/demultiplexing capability between T2 lines 41-47 and T3 line 50, which is a multi-timeslot digital data bus operating at 44.736 Mb/S thereby providing 672 voice channels.

For simplicity, multiplexers 11-18 are designated M1-2 to represent multiplexing between DS-1 and DS-2 formats. Similarly, multiplexers 21, 22 are designated M2-3 to represent multiplexing between DS-2 and DS-3 formats.

In a transmit direction, the digital multiplexing system accepts up to 28 DS-1 inputs on buses 31-37 at 1.544 Mb/S and in two multiplexing steps to multiplexer means 10 and 20 combines them into one DS-3 output on bus 50 at 44.736 Mb/S.

In a receive direction, the multiplexing system accepts a DS-3 signal at 44.736 Mb/S on bus 50 and in two demultiplexing steps provides up to 28 DS-1 signals on buses 31-37, each at 1.544 Mb/S.

In FIG. 1, multiplexer means 10 includes a stand-by multiplexer 18 and multiplexer means 20 includes a stand-by multiplexer 22 which are provided should a fault occur in any of the other normal or active multiplexers 11-17 and 21.

In FIG. 1, protection control apparatus 30 provides appropriate monitoring for multiplexer means 10 and 20 via control buses 28, 29 respectively and should a fault occur in multiplexers 11-17 and/or 21, protection control apparatus 30 will activate, as necessary, stand-by multiplexers 18 and/or 22.

Protection control apparatus 30 monitors the performance of the digital multiplexing system and if a fault occurs in the normal M1-2 or M2-3 multiplexers, the protection apparatus determines the cause of the fault and substitutes a stand-by multiplexer 18 or 22 for the failed one. The protection control apparatus could include a keyboard for allowing manual control of testing and substitution of the stand-by units. Digital displays on the protection power unit can be provided to show the status of the protection assembly.

In FIG. 1, the protection control apparatus 30 protects the M1-2 portion of the system on a one for seven basis and provides protection for the M2-3 portion of the multiplexer on a one for one basis.

As will be described, the signal through the normal M1-2 and M2-3 multiplexers is compared bit by bit with a sample of the same signal sent through the stand-by M1-2 and M2-3 multiplexers 18, 22. All 28 DS-1 inputs are scanned sequentially and when a mismatch occurs, protection control assembly 30 isolates and checks the stand-by multiplexers 18, 22 for errors. If there are no errors, it is assumed that the normal multiplexer is faulty and the stand-by multiplexer is put into service after one final check of the failed multiplexer. If the errors persist, the system returns service on to the normal multiplexer. The faulty multiplexer in either case is alarmed and is switched into a mode that allows automatic or keyboard troubleshooting to be performed.

Figure 2A:
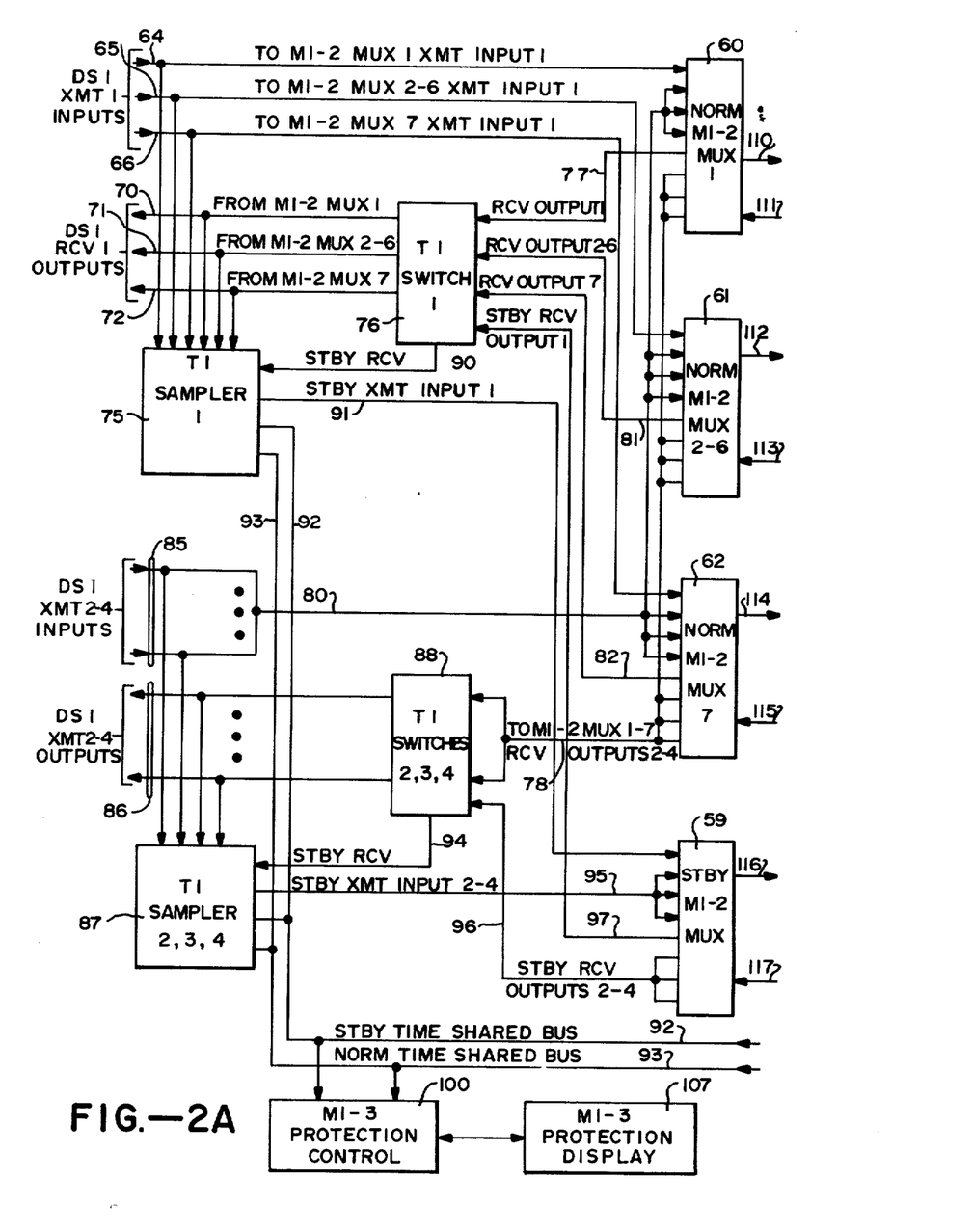
FIGS. 2A and 2B depict a more detailed diagram of the multiplexing system of FIG. 1.
Figure 2B:
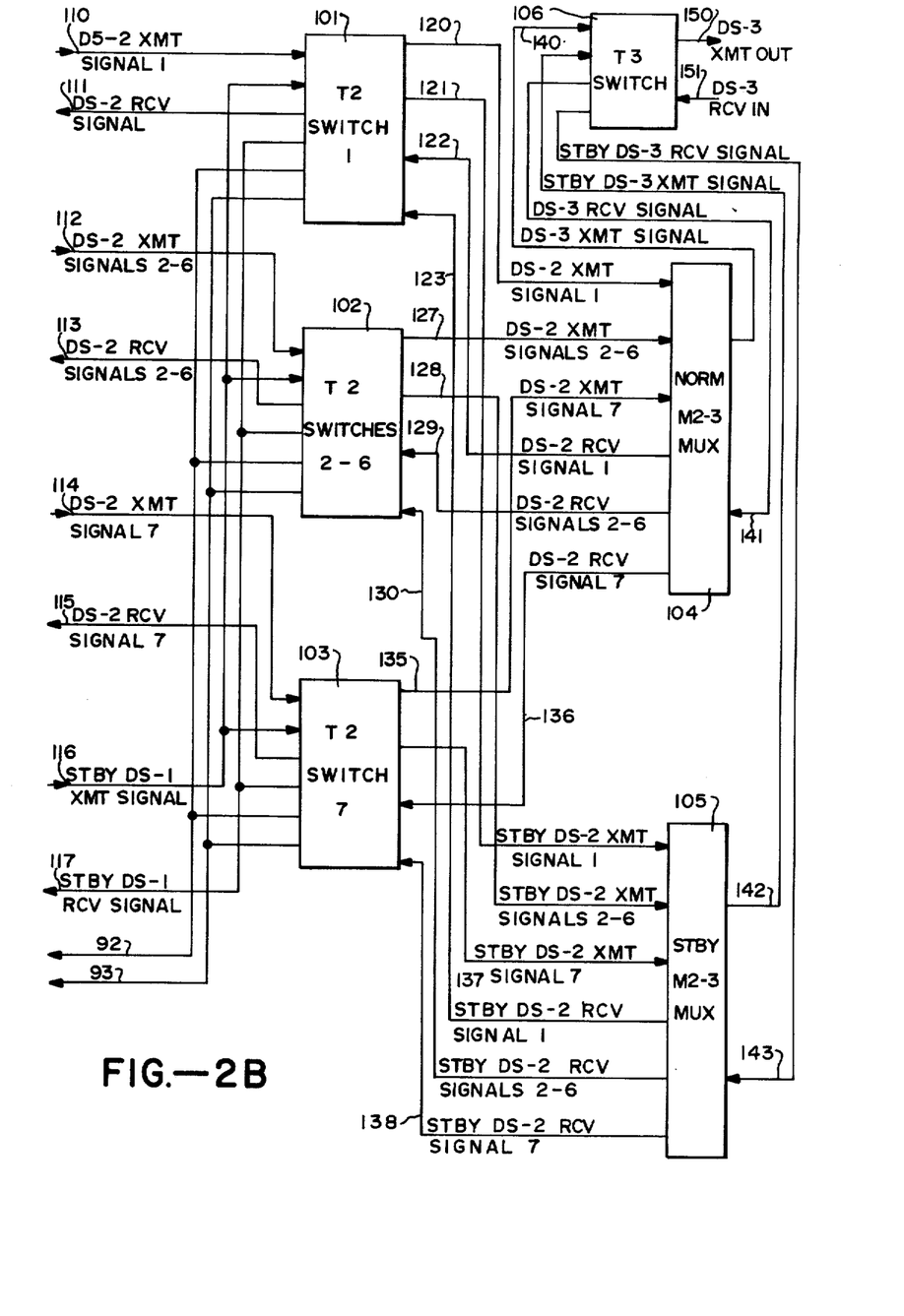

FIG. 2 depicts a block diagram of a protected M1-3 digital multiplexing system. A DS-1 transmit input such as on bus 64 is input to normal multiplexer 60, which corresponds to multiplexer 11 of FIG. 1. Similarly, transmit input on bus 65 includes five T1 inputs which are connected to multiplexer 61, which corresponds to multiplexers 12-16 of FIG. 1. T1 line 66 is input to normal multiplexer 62, which corresponds to multiplexer 17 of FIG. 1.

Similarly, remaining T1 inputs on buses 85 are input to multiplexers 60, 61, 62. Since each multiplexer 11-17 of FIG. 1 multiplexes four T1 inputs onto a T2 line, each multiplexer 60, 61, 62 of FIG. 2 receives four T1 inputs in the following manner.

Multiplexer 60 receives a T1 input on bus 64 together with three of the 21 inputs on bus 80. Similarly, multiplexers 61, 62 receive inputs in the same manner. For a transit cycle, multiplexer 60 outputs one T1 output on bus 77 and the remaining outputs on bus 78. Multiplexers 61, 62 similarly have T1 outputs on buses 81, 78 and 82, 78, respectively.

The T1 outputs from multiplexers 60-62 are input to T1 switch 76 which under normal operation outputs on buses 70, 71, 72 the received T1 outputs.

T1 switch 88 receives T1 outputs from multiplexer 60-62 and outputs twenty-one T1 outputs on bus 86 during a receive operation.

T1 sampler unit 75 monitors a DS-1 transmit and receive line pair such as lines 64, 70 from each of the seven M1-2 multiplexers 60-62 in the M1-3 digital multiplexing system. For example, sampler 75 samples the first input to the multiplexers 60, 61, 62 and sampler 87 samples the remaining 2-4 inputs and outputs to multiplexers 60, 61, 62. In the preferred embodiment, because each multiplexer is receiving four inputs and transmitting four outputs for T1 line purposes, four sampler units are utilized.

The DS-1 data stream is selected and processed by the sampler unit and then fed to the DS-1 input of stand-by multiplexer 59 on bus 91, 95 and to the protection control unit 100 on buses 92, 93 which are stand-by and normal time shared buses, respectively.

T1 switch 76 allows switching of the source of the received DS-1 bit streams from the normal M1-2 multiplexer such as multiplexer 60 to the stand-by multiplexer 59. Simultaneously, the cross connected relays of the switch units such as switch unit 76 feed the normal M1-2 multiplexer output to the T1 sampler unit such as sampler 75 for application to the protection control apparatus 100. T1 switch 94 provides necessary switching for the receive 2-4 lines 86.

In FIG. 2, the T2 switches 101, 102, 103 control switching of one set of transmit and receive DS-2 bit streams. If the normal M1-2 multiplexer fails, the source of the transmit DS-2 signals is switched to the stand-by M1-2 multiplexer 59 and the failed multiplexer receives a looped back DS-2 signal for testing purposes. The switch unit such as unit 101 also allows independent cross connection of the normal M2-3 multiplexer DS-2 output with the stand-by M2-3 multiplexer 105 output. Associated circuits provide sample DS-2 bit streams to feed the stand-by M1-2 and M2-3 multiplexers and the protection control unit 100.

The T3 switch 106 includes a relay to provide a DS-3 loop back path for the normal M2-3 multiplexer 104 and to allow the stand-by M2-3 multiplexer 105 to serve as a source of DS-3 signals. Assoicated circuits in the switch 106 provide a sampled DS-3 signal to feed the stand-by M2-3 multiplexer 105. The T2 switch units 101-103 interface with the stand-by 1-2 multiplexer 59 through T3 switch unit 106.

The M1-3 protection control apparatus 100 includes a microprocessor which controls all sequencing of automatic tests. The sampled normal and stand-by multiplexer signals are compared in the control apparatus and the comparison process is monitored by the microprocessor. The protection control unit 100 also contains interface logic for the protection panel unit 107.

Figure 3:
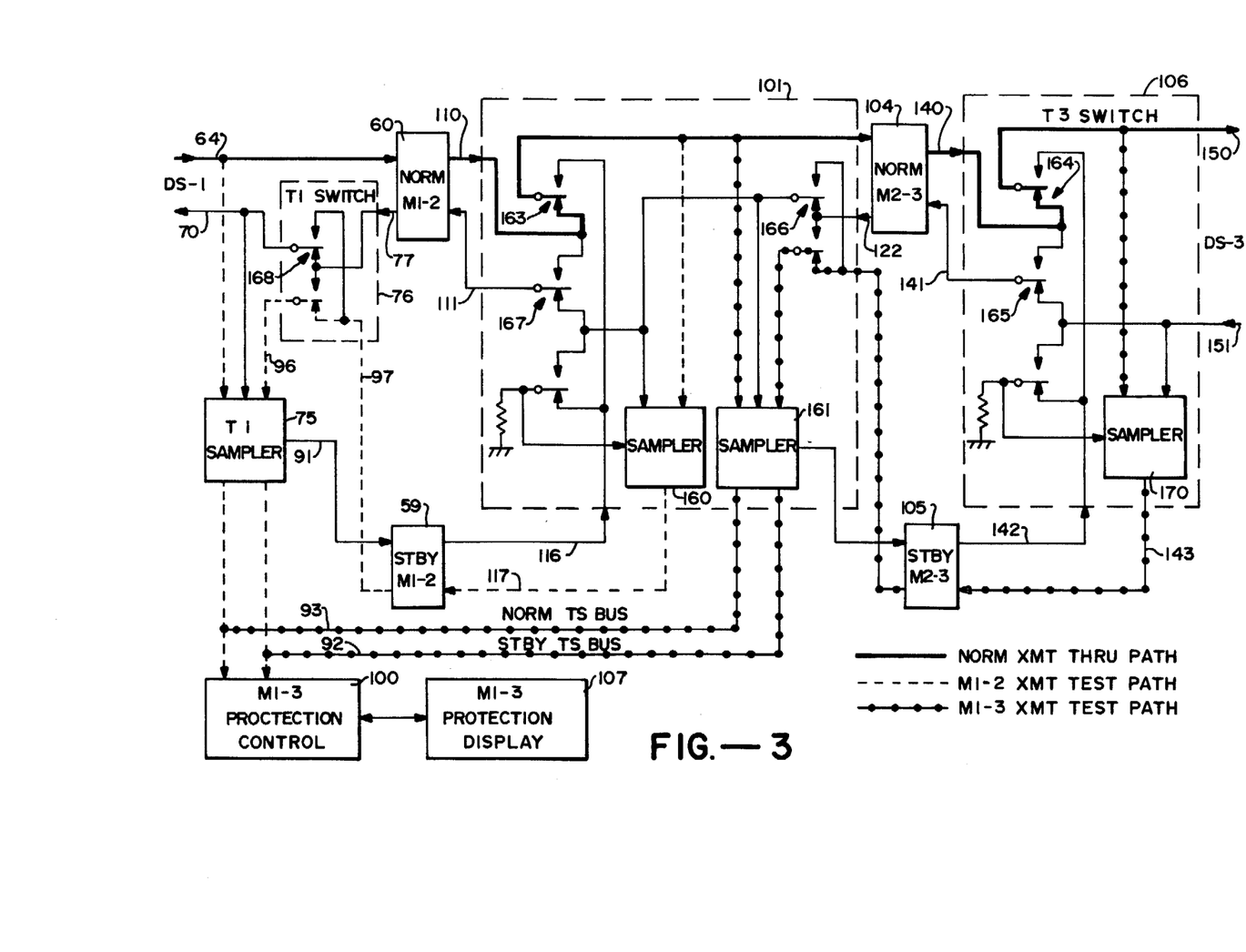
FIG. 3 depicts normal transmission operation paths.

Referring now to FIG. 3, normal operations for transmission paths will be described. For simplicity, only one DS-1 input will be described in connection with the protection control operation but it should be understood that the operation will be equally applicable to the remaining DS-1 inputs. In FIG. 3, the normal transmit path is depicted by a heavy line, the M1-2 transmit test path is depicted by a dashed line and the M2-3 test path is depicted by a dotted line.

Figure 4:
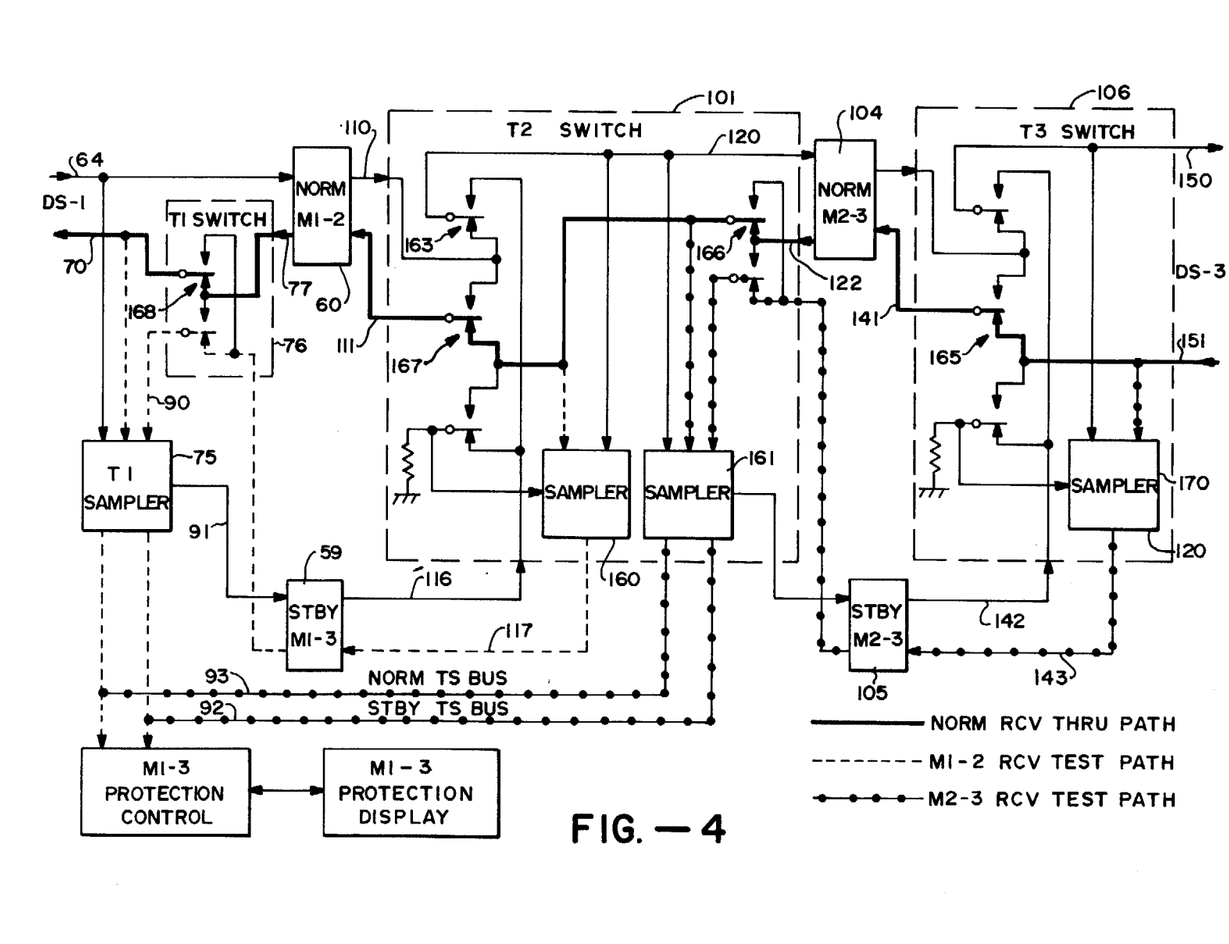
FIG. 4 depicts normal receive operation paths.

Similarly, referring to FIG. 4, for receive operations the normal receive path is depicted by a heavy line, the M1-2 receive test path is depicted by a dashed line and the M2-3 receive test path is depicted by a dotted line.

The transmit DS-2 signal from normal M1-2 multiplexer 60 passes on bus 110 into a first relay 163 in T2 switch 101. The T2 switch 101 output on bus 120 is applied to normal M2-3 multiplexer 104 and the output on bus 140 passes through a relay 164 in T3 switch 106. The transmit signal from switch 106 is output on bus 150 which is the normal DS-3 output of the system.

In FIG. 3, the receive signal on bus 151 enters the T3 switch 106 and passes through a relay 165 onto bus 141 to normal multiplexer 104, the output of which is applied on bus 122 to relay 166, the output of which passes through relay 167 onto bus 111 to normal M1-2 multiplexer 60. The output of multiplexer 60 then passes through relay 168 and T1 switch 76 and is output on bus 70 as a normal DS-1 receive signal.

An M1-2 transmit section is tested by sampling the first relay output in the T2 switch unit such as unit 101 and feeding it back to the receive section of the stand-by M1-2 multiplexer 59, the T1 switch unit relay 168, and the T1 sampler unit 75. This signal, and the transmit input signal to the M1-3 digital multiplexing system, are both applied to the protection control unit 100 for comparison.

An M2-3 transmit section is tested by sampling the relay output in the T3 switch unit 106 and feeding it back through the receive section of the stand-by M2-3 multiplexer 105 and through the second relay and sampler circuit in the T2 switch unit 101. This signal, and the DS-2 transmit signal in the T2 switch unit 101, are both applied to protection control unit 100 for comparison.

An M2-3 receive section is tested by passing the receive DS-3 input signal on bus 151 to the multiplexing system as sampled in the T3 switch unit 106 in sampler 170 through the stand-by M2-3 multiplexer 105 and the second relay in the T2 switch unit 101. This signal and the output signal of the normal M2-3 multiplexer 104 are both applied to protection control unit 100 for comparison.

An M1-2 receive section is tested by sampling its receive DS-2 signal as sampled in the T2 switch unit 101 in sampler 161 through the stand-by M1-2 multiplexer 59 and the relay of the T1 switch unit 76 to the T1 sampler unit 75. This signal and the receive output of the M1-2 digital multiplexer 60 are both applied through the T1 sampler unit 75 to the protection control unit 100 for comparison.

The transmit and receive signals from the T1 sampler unit 75 and the sampler circuits 160, 161, 170 in the T2 and T3 switch units 101, 106 are applied to the time shared buses 92, 93 for comparison by protection control unit 100. The normal time shared bus 93 carries transmit or receive signals from the normal M1-2 and M2-3 multiplexers 60, 104. Stand-by time shared bus 92 carries transmit and receive signals from the stand-by M1-2 or M2-3 multiplexers 59, 105. The actual signal placed on a time shared bus by a sample output is controlled by switching commands from the protection control unit 100. These commands first initiate self testing of all the transmit and receive pairs on the stand-by units 59, 105 and then, starting with the transmit signal from the M2-3 multiplexer 104, test in order each multiplexer installed, first in the transmit direction then in the receive direction. After the sequence has been completed the testing cycle begins again with the self test.

In the protection control unit 100, one or the other of the time shared bus bit streams on buses 92, 93 is delayed with respect to the other to realign data. The signals are then compared for a predetermined period of time. If there is a mismatch, the comparison is repeated on this pair of signals until a maximum time is exceeded. If the two streams are matched, the protection control unit 100 goes on to the next pair in sequence.

If the maximum time of comparison testing is reached without a match, the protection control unit 100 isolates the stand-by multiplexer and performs a loop back test of the stand-by path to determine the source of errors. If there are no errors, it is assumed that the normal multiplexer is the cause of the mismatch and the stand-by multiplexer is put into service after a final check of the failed multiplexer. If the errors persist, the protection control unit 100 is assumed to be the source of errors. The faulty section is alarmed in either case and automatic testing of the failed unit includes a periodic check to determine the extent of the failure and to guarantee that a failure persists. The keyboard 107 may be used to test, substitute or replace any in-service multiplexer with the out-of-service counterpart.

Figure 5:
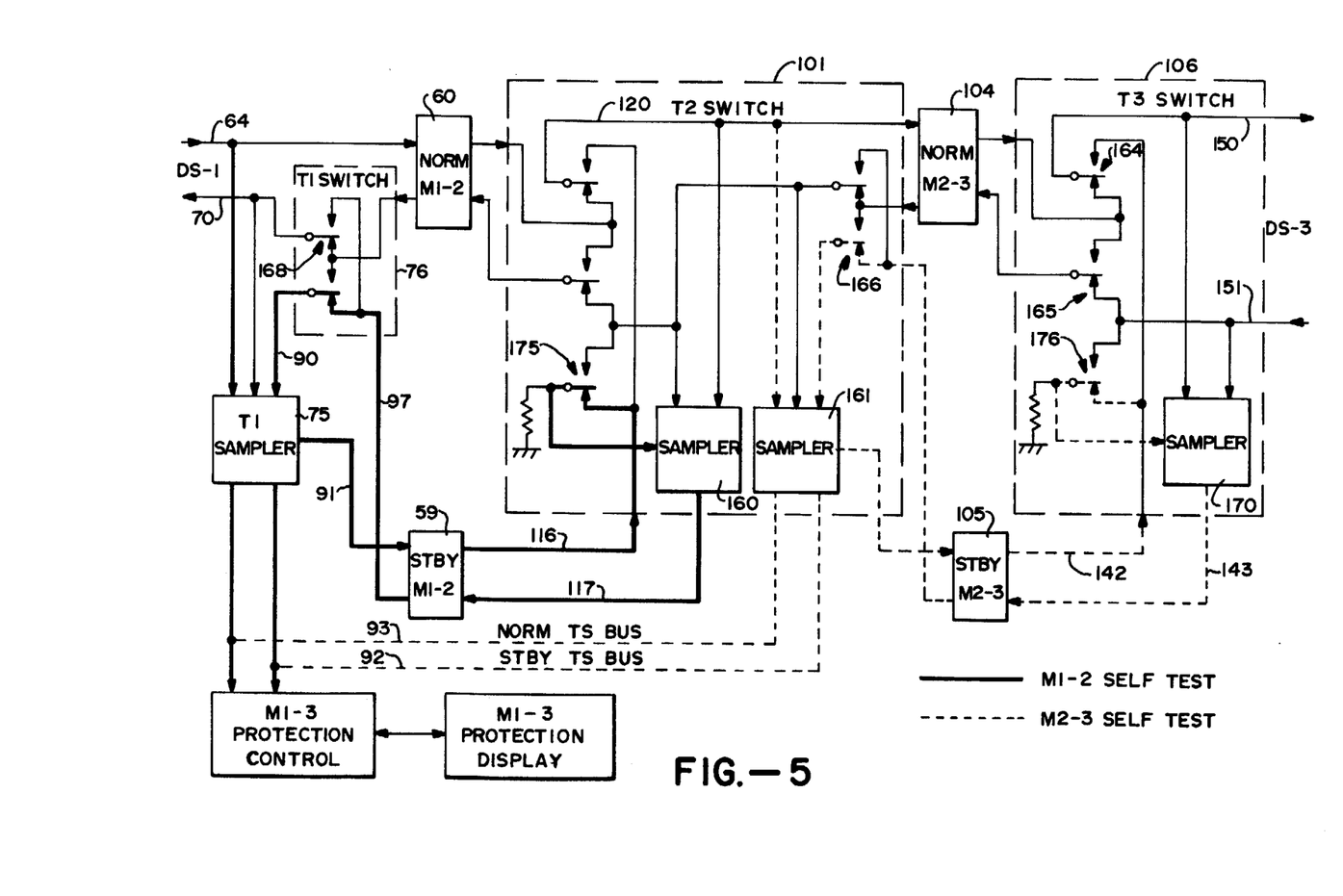
FIG. 5 depicts a self-test path of stand-by multiplexers of FIG. 2.

Referring now to FIG. 5, a self test of stand-by multiplexers is initiated by protection control unit 100 to determine the source of a data mismatch or to verify proper operation of the stand-by multiplexer 59 or 105. No actual switching of the relays takes place during a self test. The protection control unit 100 accomplishes the test with appropriate commands to the T1 sampler unit 75 and the sampler circuits 160, 61, 170 in the T2 switch unit 101 and T3 switch unit 106. Self test can be made of the stand-by M1-2 multiplexer 59 or the stand-by M2-3 multiplexer 105 without disturbing normal M1-2 or M2-3 multiplexer signal flow. The incoming DS-1 signal on bus 64 is applied to the stand-by M1-2 multiplexer 59 through the normal time shared bus 93. The multiplexer 59 output is applied to relay 175 in T2 switch unit 101 as applied to sampler unit 160, the output of which is applied on bus 117 to stand-by multiplexer 59, T1 switch 76 and back to T1 sampler unit 75 where it is applied to the stand-by time shared bus 92. Protection control unit 100 compares the input signal to the stand-by M1-2 multiplexer, as presented on the normal time shared bus 93, with the output signal of the stand-by M1-2 multiplexer 59 on the stand-by time shared bus 92.

The DS-2 transmit signal passes through a sampler circuit 161 in the T2 switch 101 as applied to the stand-by M2-3 multiplexer 105 for distribution to the protection control unit 100. The multiplexer output passes through relay 176 to sampler 170 and T3 switch 106, the output of which passes back through stand-by multiplexer 105, relay 166, sampler 161 and T2 switch 101, and applied to stand-by time shared bus 92 to protection control unit 100, which compares the input signal as presented on the normal time shared bus 93, with the output signal of the stand-by M2-3 multiplexer 105 on the stand-by time shared bus 92.

Figure 6:
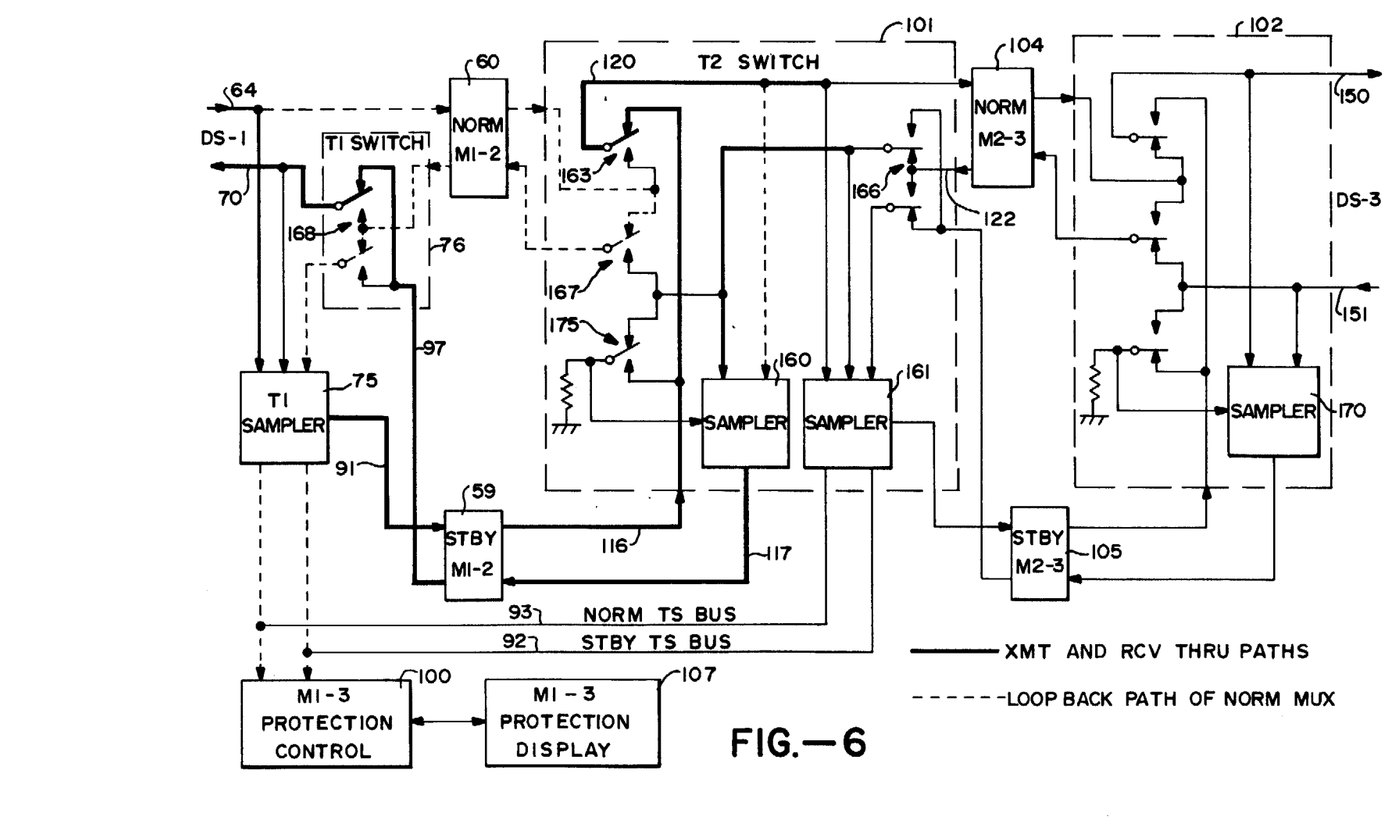
FIG. 6 depicts a substitution path for the M1-2 multiplexers of FIG. 2.
Figure 7:
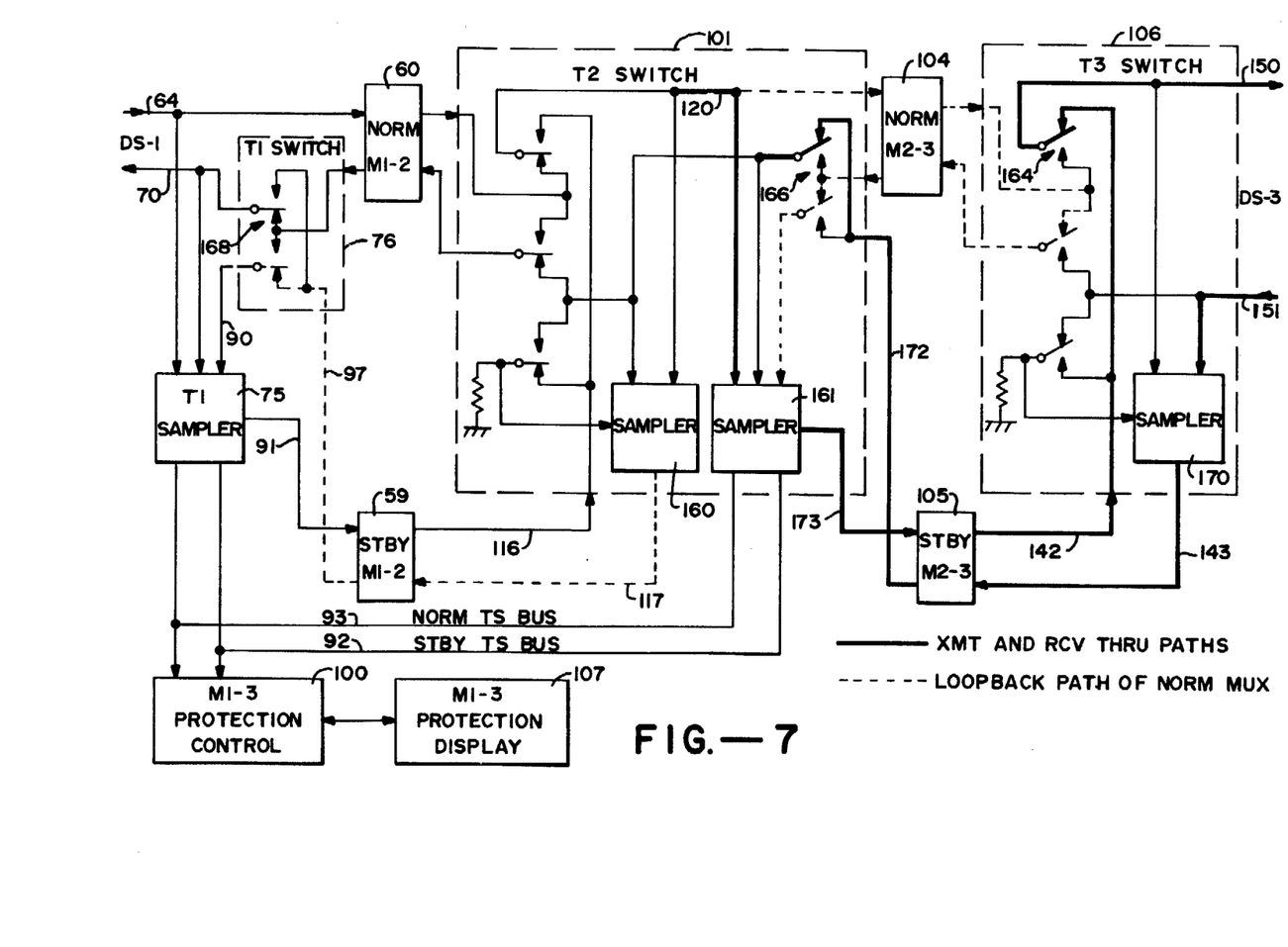
FIG. 7 depicts an M2-3 substitution path for the multiplexing system of FIG. 2.

Referring now to FIGS. 6 and 7, the M1-2 and M2-3 substitution paths are depicted, respectively.

When a fault occurs in the normal M1-2 multiplexer 60, the T1 switch unit 76 and a first relay 163 are sent by commands from the protection control unit 100. Signal flow through the normal M2-3 multiplexer 104 is not affected.

The incoming DS-1 transmit signal on bus 64 passes through T1 sampler unit 75, the stand-by multiplexer 59, and relay 163 in T2 switch 101. The receive signal passes through sampler circuit 160 in T2 switch 101, stand-by multiplexer 59, and T1 switch 76 (via relay 168).

At the same time, the DS-1 signal is applied to the normal M1-2 multiplexer 60 and the output is looped back to the first relay 163 in the T2 switch unit 101. This signal then passes through T1 switch unit 76 and the T1 sampler unit 75 and is applied to the stand-by time shared bus 92 for comparison with the incoming DS-1 signal. The comparison process done by protection control unit 100 verifies that there is trouble in the normal M1-2 multiplexer 60. Manual test commands can be entered through the keyboard using the looped back signal for troubleshooting the individual unit level.

When a fault occurs in the M2-3 multiplexer 104, a relay 166 in T2 switch unit 101 and relay 164 in T3 switch unit 106 are set by commands from protection control unit 100. Signal flow through the normal M1-2 multiplexer 60 is unaffected.

The DS-2 signal passes through a sampler circuit 161 in the T2 switch unit 101, the stand-by multiplexer 105 and relay 166 in the T3 switch unit 106 to become the DS-3 transmit output on bus 150. The receive DS-3 signal on bus 151 passes through the sampler circuit 170 in T3 switch 106, the stand-by M2-3 multiplexer 105 to relay 166 in the T2 switch unit 101. At the same time, the normal M2-3 multiplexer 104 output is looped back through the relay 164, the T3 switch unit 106 and is applied to the standby time shared bus 92 for comparison with the DS-2 signal from the transmit path of the T2 switch unit 101. Protection control unit 100 uses the comparison signals to verify trouble in the normal M2-3 multiplexer 104.

The protection control unit 100 provides the bit checking and control functions for the protection system. A microprocessor generates all the control signals required for tests of the various parts of the M1-2 and M2-3 multiplexing systems, interprets the results of the tests, controls the substitution of the failed units and provides alarm status information. The protection control unit 100 includes means for realigning the bit streams and performs the actual real time comparisons.

While in its automatic mode of operation, the microprocessor sequences through an orderly set of tests which checks all of the individual data paths of the M1-3. If the microprocessor finds an M1-2 or M2-3 multiplexer which is faulty, it branches to an alternate test program as prescribed by its stored program. These sequences recheck the failed as well as the spare unit before attempting a substitution. When substituted, alarms are generated and further testing of the failed multiplexing level is discontinued.

While in a manual mode, the processor will respond to commands entered from display 107 and is able to duplicate any automatic type test under user control. This mode is particularly useful for maintenance and troubleshooting purposes.

Because the two comparable data streams arrive at the protection control unit via different paths and therefore different absolute delays, the bit streams must first be closely realigned. One of the bit streams goes to an elastic store for fine alignment, then is compared for exact matches with the other data stream. The results of this comparison are used by the processor to evaluate the M1-3 system.

Figure 8:
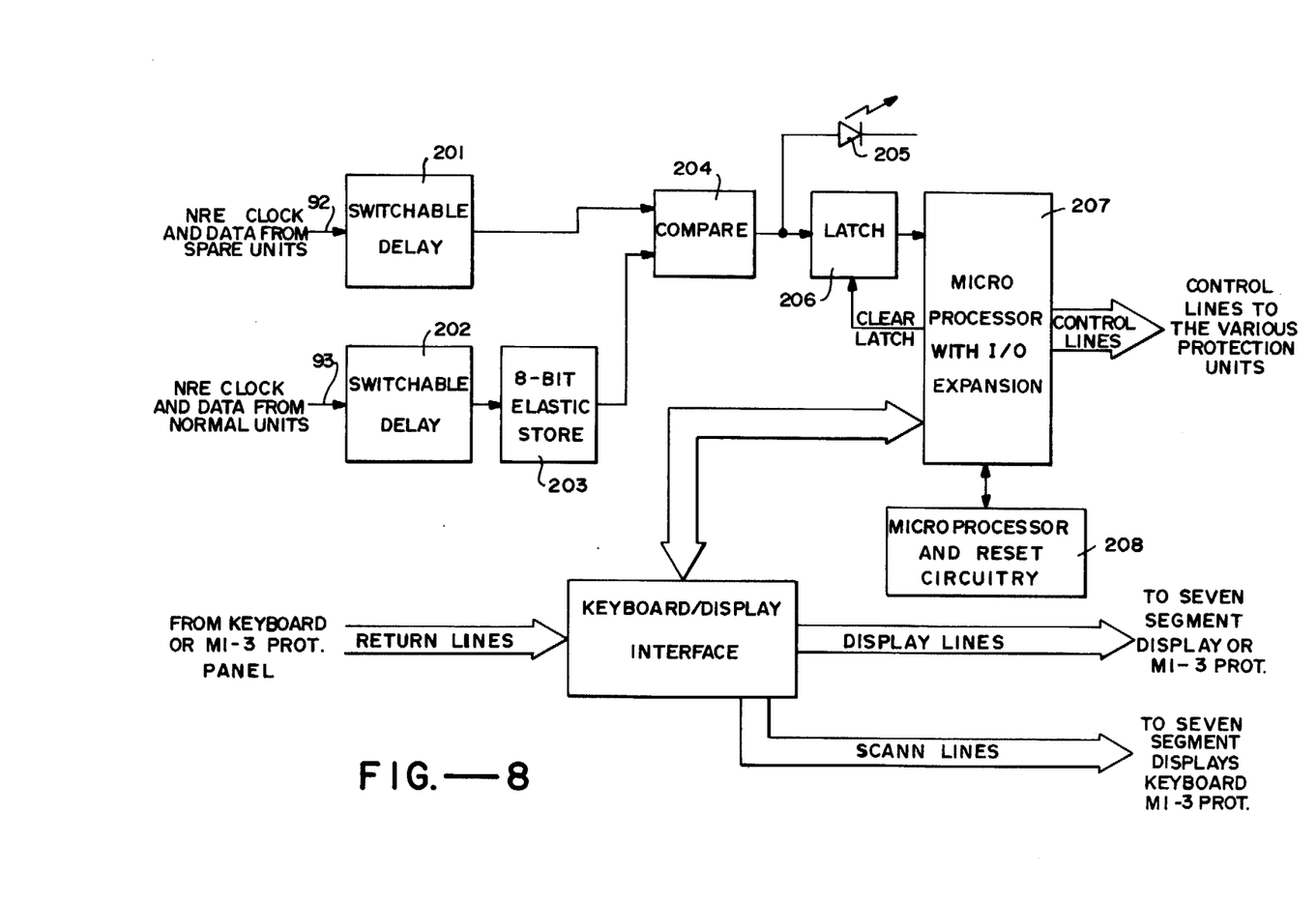
FIG. 8 depicts a block diagram of the protection control unit which forms a portion of FIG. 1.

FIG. 8 is a block diagram of the protection control unit 100 of FIG. 1. Clock and data signals from spare units on bus 92 are input to switchable delay 201 while clock signals and data from normal units on bus 93 are input to switchable delay 202 and input to 8-bit elastic store 203. Evaluations of the on-line equipment are made by performing, in compare circuit 204, a bit by bit comparison between the samples of the actual data stream and the samples of the appropriately sourced data stream from the spare unit.

Figure 9:
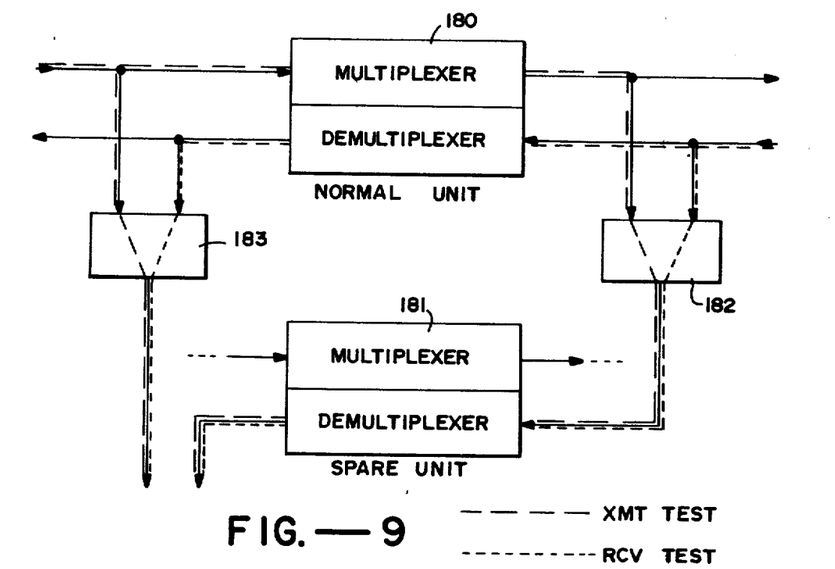
FIG. 9 depicts the test paths for the system of FIG. 1.

FIG. 9 depicts the bit stream routing used to accomplish these comparisons. Tests of the transmit (multiplexing) half of an M1-2 or M2-3 normal unit 180 are done by looping the high speed output back through the receive (demultiplexing) side of spare unit 181 then comparing the individual low speed on-line transmit data to the low speed spare receive data. Tests of the receive section are done by feeding the on-line high speed input to spare unit 181 then comparing the individual low speed outputs of the on-line and spare units 180, 181, respectively. The processor controlled tests continuously cycle through all M1-2 and M2-3 transmit and receive sections until this fault is detected. If after further tests, which are designed to isolate the source of the fault, the inservice equipment 180 is indicated, the spare unit 181 is put on line and testing of other similar rate multiplexers are discontinued. Appropriate alarm information is generated and protection cycle continues using the available spare unit 181.

Figure 11:
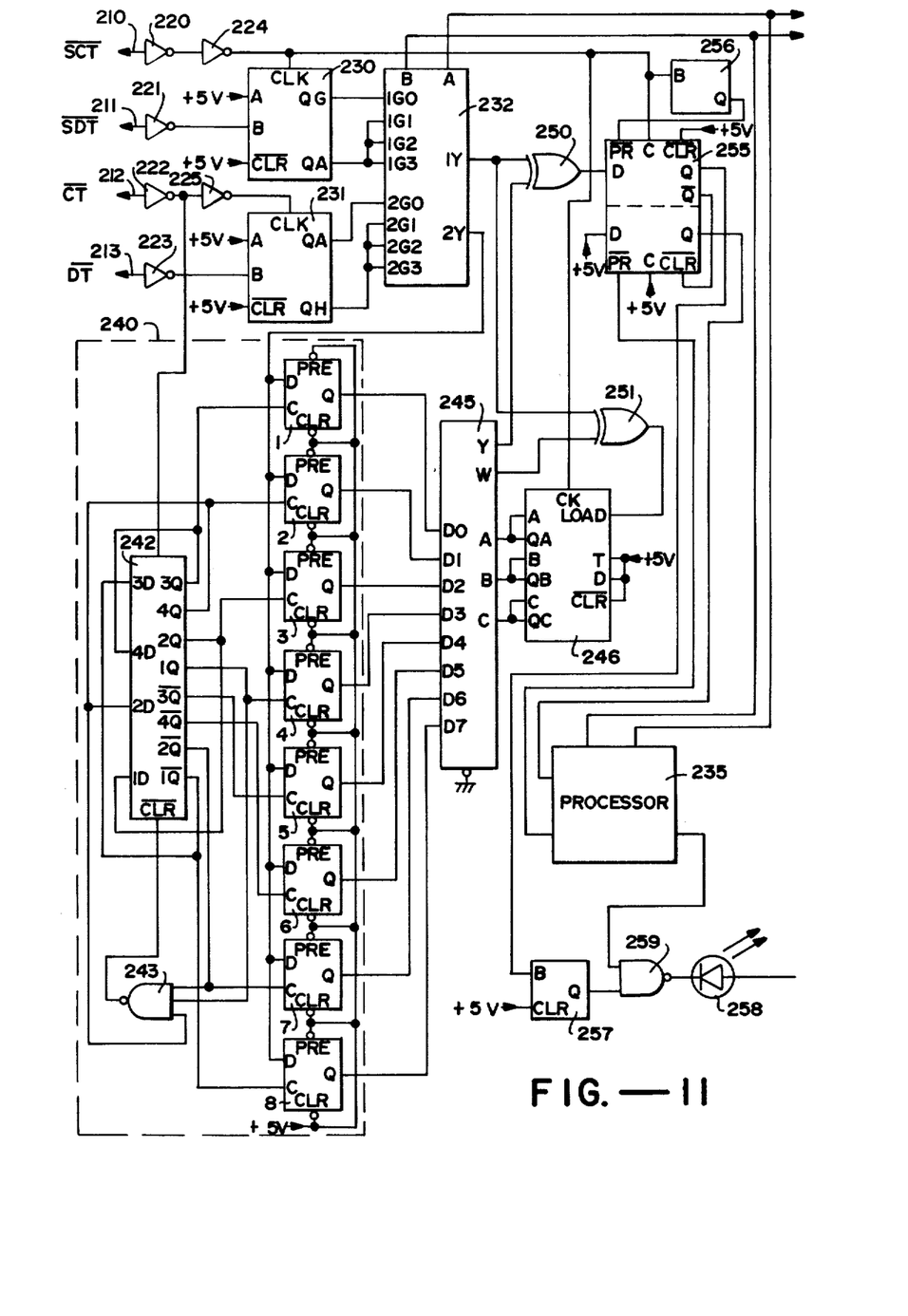
FIG. 11 depicts a more detailed diagram of a protection control unit of FIG. 8.

In FIG. 11, the sample clock and data signals arrive at the M1-3 protection control unit via two sets of buses. The first of these buses carry the in-service sample indentified as CT and DT while the second carries the spare sample identified as SCT and SDT, respectively. The signals are buffered and the clock signals are reinverted to the proper phase to center sample the two data into shift registers.

The two data streams arriving at the protection control unit should be identical except for finite time shifts introduced by various pieces of equipment. The major portion of the delays contributed by the elastic stores within the equipment and the delay averages about 4-bit periods. The delay is removed in a two-step process, first using a fixed delay device typically a shift register and second using a variable delay device typically an elastic store.

Figure 10:
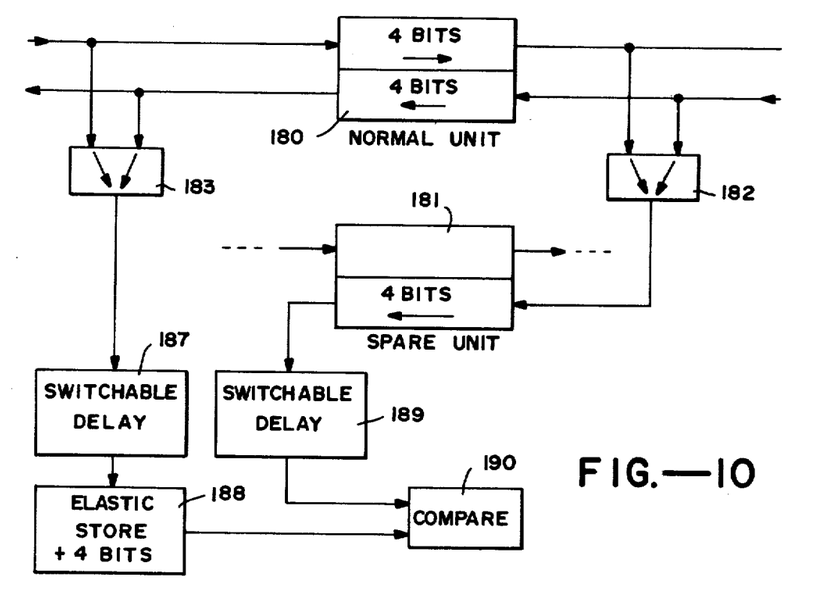
FIG. 10 depicts the delays present in the system of FIG. 1.

FIG. 10 depicts where the delays arise and accounts for the amount of fixed delay incorporated into the protection control unit in units 180–190.

Referring now to FIG. 11, the protection control unit of FIG. 8 is depicted in further detail in which the CT signal on bus 212 and DT signal on bus 213, and the SCT and SDT signals on buses 210, 211, respectively, are buffered by buffers 220–223 and the clock signals are reinverted by buffers 224, 225 to the proper phase to center sample the true data into shift registers 230, 231.

The fixed delays are introduced into the bit stream by shift register 230, 231 which are typically LS164. Two taps from each register 230, 231 are bused to multiplexer 232 (typically LS153) which under control from processor 235 (typically Intel's 8748 microprocessor) which selects the appropriately delayed pair in multiplexer 232. During transmit type test, the 5-bit delayed in-service sample and the 0-bit delayed spare sample are selected, while during received tests, the 6-bit delayed spare sample and the 0-bit delayed in service sample is selected. These fixed delays vary somewhat from the delays outline above in FIG. 10 to account for other delays encountered in the equipment.

The variable delays are introduced into the bit stream by elastic store means 240, which is an 8-bit first in first out register with independent read and write clocks.

In the operation of elastic store means 240, the first eight data bits are sequentially clocked into storage cells 240-1 through 240-8. The ninth data bit is then written into the first cell 240-1, the tenth bit to second cell 240-2, and so forth with each subsequent bit overwriting the contents of the cell it has been written into eight clocks earlier. The cells are read using the clock associated with the other bit stream. System timing is such that the cells are read an average of four clock periods after they are written (or four clock periods before they are overwritten), which allows for maximum tolerance of jitter and high frequency clock differences.

Counter 242 is a four-bit Johnson counter which divides the input clock by eight, producing eight equally phased "write" clocks for elastic store means 240. Gate 243 prevents counter 242 from maintaining an illegal state, especially from startup. A Johnson counter alternately shifts ones then zeros through the "end" storage locations passing through two end different states. For example, a three-bit Johnson counter attains these six states: 000, 100, 110, 111, 011, 001, and repeat.

Flip flops 240-1 through 240-8 form storage cells 1 through 8 and the input data is bused to all of the inputs and is clocked into only one by the rising edge of one of the eight phase clocks from counter 242. Clock data then passes out of the two outputs of store means 240 to data selector 245 (typically LS151). The address inputs of selector 245 are driven by 3-bit counter 246 (typically LS161A) which advances on each positive transition of the clock input from bus 210 while the load input is high.

The two adjusted bit streams are compared in exclusive-OR gates 251, 250. Gate 251 has a high output if the two bits are identical since the elastic store bit stream is inverted by using the W output. Gate 250 has a low output if the two bits are identical.

The gate 251 output is used to control the load input of counter 246. It is synchronously read on the rising edge of the clock so activity at other times is ignored.

Gate 251 output is clocked into flip flop 255 at the end of the bit period. The $\bar{Q}$ output goes high for mismatches and the Q output goes high for matches. Absence of clock transitions for more than two usec (about 25 DS-1 clock periods) is trapped by one shot multivibrator 256 and used to set the upper portion of flip flop 255. Individual mismatches from flip flop 255 are stretched to about five msec by multivibrator 257 for visual display through LED 258, which is enabled only during the manual mode tests by gate 259.

The lower half of flip flop 255 is set at the beginning of a test period by microprocessor 235 and is reset by the upper half of flip flop 255 during a test period if a mismatch occurs.

When the load/input of counter 246 is high, for each load to high clock transition, counter 246 is incremented by one thus allowing the next location in elastic store means 240 to be read and compared with the spare bit stream. When it goes low, the count is held (the outputs are used to "preset" the counter) to attempt a comparison with the next "spare" bit and the last "normal" bit. This mismatch in the two data streams indicates that either the two bit streams are misaligned or not identical. Misalignment occurs at the start of a test before the elastic store has "fine tuned" the delay. However, after a suitable alignment period, mismatches indicate a failure of the equipment.

The output of flip flop 255 is read by processor 235 at the end of a test period on the basis of a good or bad test period processor continues in a cycle or attempts further tests.

What is claimed is:

1. A digital multiplexing system comprising first active multiplexer means connected to a plurality of multi-timeslot digital data buses for multiplexing first digital data on said plurality of buses onto a first multi-timeslot bus, first sampler means for sampling specified ones of said first digital data thereby forming a first serial bit stream, second sampler means for sampling specified ones of said multiplexed data corresponding to said first digital data, second standby multiplexer means connected to said plurality of buses and said first bus for demultiplexing specified ones of said sampled multiplexed data, said first sampler means responsive to said demultiplexed data, thereby forming a second serial bit stream corresponding to said first serial bit stream, protection control apparatus for comparing the corresponding bits of said first and second serial bit streams and for generating an alarm signal when a mismatch occurs between the comparison of said bit streams within a predetermined period of time, and means responsive to said alarm signal for inactivating said active multiplexer means and activating said standby multiplexer means.

2. A system as in claim 1 wherein said first multiplexer means include a plurality of multiplexer apparatus each for multiplexing the digital data on some of said plurality of buses and sampling means for sequentially sampling the digital data under control of said protection control apparatus.

3. A system as in claim 1 wherein said protection control apparatus includes first register means connected to receive said first serial digital data stream, second register means connected to receive said second serial digital data stream corresponding to said first stream, elastic store means for sequentially storing the serial bits in said second data stream, selector means for selecting the stored bits in said elastic store means, comparator means for comparing said first serial data stream with said selected storage bits from said store means on a bit by bit basis and generating a control signal when a mismatch occurs, and processor means for controlling the operation of the protection control apparatus.

4. A digital multiplexing system comprising first active multiplexer means for demultiplexing first digital data on a first multi-timeslot digital data bus onto a plurality of multi-timeslot digital data buses, first sampler means for sampling specified ones of said first digital data on said first bus, standby multiplexer means connected to receive the sampled multiplexed data for forming demultiplexed data, second sampler means responsive to said first and second demultiplexed data for forming first and second serial bit streams, respectively, protection control apparatus for comparing the corresponding bits of said first and second serial bit streams and for generating an alarm signal when a mismatch occurs between the comparison of said first and second bit streams within a predetermined period of time, and means responsive to said alarm signal for inactivating said active multiplexer means and activating said standby multiplexer means.

5. A digital multiplexing system comprising first active multiplexer means connected to a plurality of multi-timeslot digital data buses for multiplexing first digital data on said plurality of buses to a first multi-timeslot bus, first sampler means for sampling specified ones of said first digital data thereby forming a first serial bit stream, second sampler means for sampling specified ones of said multiplexed data corresponding to said first digital data, second standby multiplexer means connected to said plurality of buses and to said first bus, said second multiplexer means including means for demultiplexing specified ones of said sampled multiplexed data, said first sampler means responsive to said demultiplexed data thereby forming a second serial bit stream corresponding to said first serial bit stream, protection control apparatus for comparing the corresponding bits of said first and second serial bit streams and for generating an alarm signal when a mismatch occurs between the comparison of said first and second bit streams within a predetermined period of time, said first multiplexer means including a plurality of multiplexer apparatus each for multiplexing the digital data on some of said plurality of buses, said protection control apparatus including first register means connected to receive said first serial digital data stream, second register means connected to receive said second serial digital data stream, elastic store means for sequentially storing the serial bits in said second data stream, selector means for selecting the stored bits in said elastic store means, comparator means for comparing said first serial data stream with said selected stored bits on a bit by bit basis and for generating a control signal when a mismatch occurs, and processor means for controlling the operation of the protection control apparatus.

6. A digital multiplexing system comprising first active multiplexer apparatus connected to a plurality of multi-timeslot digital data buses, each of said plurality of buses for multiplexing first digital data on said plurality of buses to a first multi-timeslot bus, first sampler means for sampling specified ones of said first digital data thereby forming a first serial bit stream, second sampler means for sampling specified ones of said multiplexed data corresponding to said first digital data, second standby multiplexer means connected to said plurality of buses and to said first bus for demultiplexing specified ones of said sampled multiplexed data, said first sampler means responsive to said demultiplexed data thereby forming a second serial bit stream corresponding to said first serial bit stream, said first multiplexer means including a plurality of multiplexer apparatus each for multiplexing the digital data on some of said plurality of buses and sampling means for sequentially sampling the digital data, protection control apparatus for comparing the corresponding bits of said first and second serial bit streams and for generating an alarm signal when a mismatch occurs between the comparison of said first and second bit streams within a predetermined period of time, thereby representing a failure of one of said multiplexer apparatus, and means responsive to said alarm signal for inactivating the failed multiplexer means and activating the standby multiplexer means.

7. In a digital data multiplexing system, protection control apparatus comprising register means connected to receive first and second serial digital data streams, said second serial digital data stream corresponding to said first stream, elastic store means for sequentially storing the serial bits in said second data stream, selector means for selecting the stored bits in said elastic store means, comparator means for comparing said first serial data stream with said selected stored bits on a bit by bit basis and generating a control signal when a mismatch occurs, and processor means for controlling the operation of said register means, said store means and said comparator means.

8. In a digital data multiplexing system, protection control apparatus comprising first register means connected to receive a first serial digital data stream, second register means connected to receive a second serial digital data stream corresponding to said first stream, elastic store means for sequentially storing the serial bits in said second data stream, selector means for selecting the stored bits in said elastic store means, comparator means for comparing said first serial data stream with said selected storage bits from said store means on a bit by bit basis and generating a control signal when a mismatch occurs, and processor means for controlling the operation of said register means, said store means, said selector means and said comparator means.

* * * * *